(12) United States Patent
Montinaro et al.

(10) Patent No.: US 10,344,642 B2
(45) Date of Patent: Jul. 9, 2019

(54) SYSTEMS AND METHODS FOR CONTROLLING EXHAUST FLOW THROUGH DUAL AFTER TREATMENT DEVICE

(71) Applicant: GM GLOBAL TECHNOLOGY OPERATIONS LLC, Detroit, MI (US)

(72) Inventors: Giovanni Montinaro, San Pietro Vernotico (IT); Andrea Dutto, Turin (IT); Claudio Ciaravino, Turin (IT); Andrea Arnone, Turin (IT); Stefano Cassani, Altavilla Monferrato (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 15/612,751

(22) Filed: Jun. 2, 2017

(65) Prior Publication Data
US 2018/0347433 A1 Dec. 6, 2018

(51) Int. Cl.
*F01N 3/20* (2006.01)
*F01N 3/08* (2006.01)
*F01N 3/10* (2006.01)
*F01N 9/00* (2006.01)
*F01N 13/00* (2010.01)

(52) U.S. Cl.
CPC ......... *F01N 3/0842* (2013.01); *F01N 3/0814* (2013.01); *F01N 3/103* (2013.01); *F01N 3/2066* (2013.01); *F01N 9/00* (2013.01); *F01N 13/009* (2014.06); *F01N 13/017* (2014.06); *F01N 2290/00* (2013.01); *F01N 2390/00* (2013.01); *F01N 2900/08* (2013.01); *F01N 2900/1404* (2013.01); *F01N 2900/1602* (2013.01)

(58) Field of Classification Search
CPC ...... F01N 3/017; F01N 3/0878; F01N 3/2053; F01N 3/2892; F01N 13/011; F01N 13/017; F01N 2410/03; F01N 2410/06; F01N 2410/12
See application file for complete search history.

(56) References Cited

U.S. PATENT DOCUMENTS

2017/0226911 A1* 8/2017 Haas ..................... F01N 3/2053

* cited by examiner

*Primary Examiner* — Jonathan R Matthias
(74) *Attorney, Agent, or Firm* — Lorenz & Kopf LLP

(57) ABSTRACT

Systems and methods for controlling a valve for directing an exhaust gas stream through an exhaust duct having a first after treatment device and a second after treatment device in an exhaust system. The method includes receiving sensor signals from a sensor coupled to the second after treatment device. The method includes processing the sensor signals to determine a temperature of the second after treatment device, and determining a position for the valve based on whether the temperature exceeds a pre-defined threshold for the temperature of the second after treatment device. The method includes outputting a control signal to move the valve to a first position in which the exhaust gas stream flows through a first portion of the first after treatment device or a second position in which the exhaust gas stream flows through a second portion of the first after treatment device based on the temperature.

18 Claims, 9 Drawing Sheets

SYSTEMS AND METHODS FOR CONTROLLING EXHAUST FLOW THROUGH DUAL AFTER TREATMENT DEVICE

TECHNICAL FIELD

The present disclosure generally relates to vehicles, and more particularly relates to systems and methods for controlling an exhaust flow through a dual after treatment device associated with the vehicle.

INTRODUCTION

Generally, vehicles, such as motor vehicles, are powered by a propulsion system. Certain motor vehicles employ a diesel engine as a propulsion system, which provides power that is transferred to a transmission, for example, and used to drive the motor vehicle. Due to the operating characteristics of a diesel engine, one or more after treatment devices may be employed to remove combustion byproducts, such as diesel particulate matter, carbon monoxide, nitrogen oxides, unburned hydrocarbons, and the like, from an exhaust stream prior to the exhaust stream exiting the vehicle. In certain instances, such as low temperature operating conditions, a particular after treatment device, such as a selective catalytic reduction (SCR) system may not be as efficient in removing the combustion byproducts as another after treatment device, such as a lean nitrogen oxide trap (LNT). In other instances, such as high temperature operating conditions, the LNT system may not be as efficient in removing the combustion byproducts as the SCR system.

Accordingly, it is desirable to provide a system and method for controlling exhaust gas stream through a dual after treatment device, to an exhaust gas stream through a LNT or through a diesel oxidation catalyst (DOC) before entering an SCR system, for example. The use of a dual after treatment device, such as the LNT with the SCR system, provides for efficient removal of combustion byproducts over a range of operating temperatures. Furthermore, other desirable features and characteristics of the present disclosure will become apparent from the subsequent detailed description and the appended claims, taken in conjunction with the accompanying drawings and the foregoing technical field and background.

SUMMARY

In various embodiments, provided is a method for controlling a valve for directing an exhaust gas stream through an exhaust duct having a first after treatment device and a second after treatment device in an exhaust system of a vehicle. The method includes receiving, by a processor, first sensor signals from a first sensor coupled to the second after treatment device. The second after treatment device is downstream from the first after treatment device. The method includes processing, by the processor, the first sensor signals to determine a temperature of the second after treatment device, and determining, by the processor, a position for the valve based on whether the temperature exceeds a pre-defined threshold for the temperature of the second after treatment device. The method includes outputting, by the processor, a control signal to an actuator system to move the valve to a first position in which the exhaust gas stream flows through a first portion of the first after treatment device or a second position in which the exhaust gas stream flows through a second portion of the first after treatment device based on the temperature of the second after treatment device.

The outputting the control signal to the actuator system to move the valve includes determining, by the processor, the position for the valve based on the temperature exceeding the pre-defined threshold and a current valve position as the first position and outputting, by the processor, the control signal to move the valve to the second position. The outputting the control signal to the actuator system to move the valve to the second position includes determining, by the processor, a current load of an engine of the vehicle exceeds a pre-defined threshold for the load of the engine, and outputting, by the processor, the control signal to move the valve to a third position in which the exhaust gas stream flows through both the first portion and the second portion of the first after treatment device. The outputting the control signal to the actuator system to move the valve to the second position includes determining, by the processor, a performance of a regeneration of a diesel particulate filter associated with the second after treatment device, and outputting, by the processor, the control signal to move the valve to a third position in which the exhaust gas stream flows through both the first portion and the second portion of the first after treatment device. Based on the current valve position as the second position, the method includes outputting a signal to inject diesel exhaust fluid into the exhaust gas stream. The method includes receiving, by the processor, a startup command to start an engine associated with the vehicle, outputting, by the processor, the control signal to the actuator system to move the valve to the first position based on the start-up command. The method includes receiving, by the processor, a shutdown command to shutdown an engine associated with the vehicle, outputting, by the processor, the control signal to the actuator system to move the valve to a third position in which the exhaust gas stream flows through both the first portion and the second portion of the first after treatment device based on the shutdown command. Based on the first temperature as below the pre-defined threshold, the outputting the control signal to the actuator system to move the valve includes determining, by the processor, a loading of the second portion with combustion byproducts, and outputting, by the processor, a de-nitrogen oxide command to regenerate the second portion of the first after treatment device based on the determined loading of the second portion.

In various embodiments, a control system for an exhaust system having a first after treatment device and a second after treatment device in an exhaust pipe of a vehicle is provided. The control system includes a first sensor coupled to the second after treatment device configured to observe a temperature of the second after treatment device and generate sensor signals based on the observation. The second after treatment device is downstream from the first after treatment device. The control system includes a valve coupled to the first after treatment device that is movable between a first position in which the exhaust gas stream flows through a first portion of the first after treatment device or a second position in which the exhaust gas stream flows through a second portion of the first after treatment device. The control system includes an actuator system coupled to the valve and configured to move the valve between the first position and the second position. The control system includes a controller, having a processor, configured to: process the sensor signals to determine a temperature of the second after treatment device; determine a position for the valve based on whether the temperature exceeds a pre-defined threshold for the temperature of the second after treatment device; and output a control signal to the actuator system to move the valve to the first position or the second position based on the temperature of the second after treatment device.

The first portion of the first after treatment device is a diesel oxidation catalyst and the second portion is a lean nitrogen oxide trap. The second after treatment device is a diesel particulate filter coated with a selective catalytic reduction catalyst. Based on the first temperature exceeding the pre-defined threshold and a current valve position as the first position, the controller is configured to output the control signal to move the valve to the second position. Based on the current valve position as the second position, the controller is configured to determine a current load of an engine of the vehicle exceeds a pre-defined threshold for the load of the engine, and the controller is configured to output the control signal to move the valve to a third position in which the exhaust gas stream flows through both the first portion and the second portion of the first after treatment device. Based on the current valve position as the second position, the controller is configured to determine a performance of a regeneration of a diesel particulate filter associated with the second after treatment device, and the controller is configured to output the control signal to move the valve to a third position in which the exhaust gas stream flows through both the first portion and the second portion of the first after treatment device. Based on the current valve position as the second position, the controller is configured to output a signal to inject diesel exhaust fluid into the exhaust gas stream. The controller is configured to receive a startup command to start an engine associated with the vehicle and to output the control signal to the actuator system to move the valve to the first position based on the start-up command. The controller is configured to receive a shutdown command to shutdown an engine associated with the vehicle and to output the control signal to the actuator system to move the valve to a third position in which the exhaust gas stream flows through both the first portion and the second portion of the first after treatment device based on the shutdown command. Based on the temperature as below the pre-defined threshold, the controller is configured to determine a loading of the second portion with combustion byproducts and to output a de-nitrogen oxide command to regenerate the second portion of the first after treatment device based on the determined loading of the second portion.

According to various embodiments, a vehicle is provided. The vehicle includes an exhaust system having a first after treatment device and a second after treatment device in an exhaust pipe. The second after treatment device is downstream from the first after treatment device and the first after treatment device includes a diesel oxidation catalyst and a lean nitrogen oxide trap each disposed within a housing. The vehicle includes a valve coupled to the first after treatment device that is movable between a first position in which the exhaust gas stream flows through the diesel oxidation catalyst of the first after treatment device or a second position in which the exhaust gas stream flows through the lean nitrogen oxide trap of the first after treatment device. The vehicle includes an actuator system coupled to the valve and configured to move the valve between the first position and the second position. The vehicle includes a controller, having a processor, configured to: process the sensor signals to determine a temperature of the second after treatment device; determine a position for the valve based on whether the temperature exceeds a pre-defined threshold for the temperature of the second after treatment device; output a control signal to the actuator system to move the valve to the first position based on the temperature of the second after treatment device as below the pre-defined threshold for the temperature of the second after treatment device; and output a control signal to the actuator system to move the valve to the second position based on the temperature of the second after treatment device exceeding the pre-defined threshold for the temperature of the second after treatment device.

Based on the current valve position as the second position, the controller is further configured to determine a current load of an engine of the vehicle exceeds a pre-defined threshold for the load of the engine or a performance of a regeneration of a diesel particulate filter associated with the second after treatment device, and the controller is configured to output the control signal to move the valve to a third position in which the exhaust gas stream flows through both the diesel oxidation catalyst and the lean nitrogen oxide trap of the first after treatment device.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
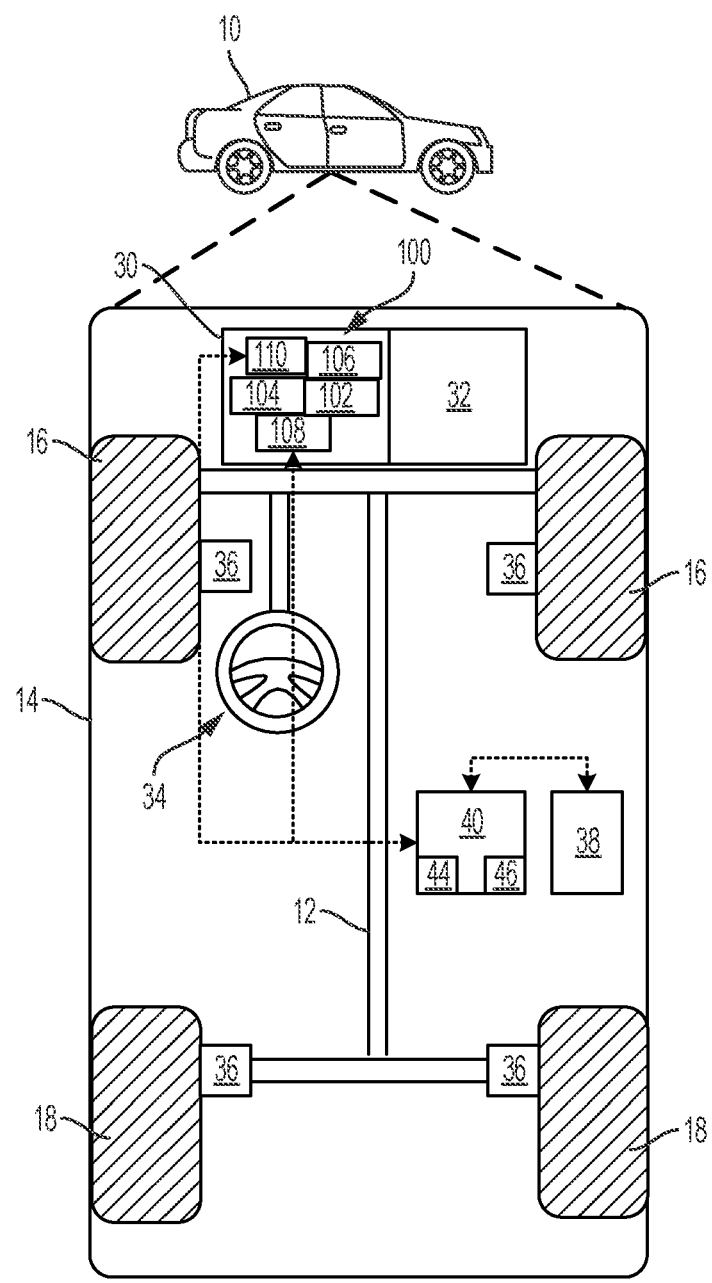
FIG. 1 is a functional block diagram illustrating a vehicle having a dual after treatment system, in accordance with various embodiments.

With reference to FIG. 1, a dual after treatment system shown generally at 100 is associated with a vehicle 10 in accordance with various embodiments. In general, the dual after treatment system 100 includes a dual catalyst system 102, a selective catalyst reduction (SCR) system 104, a valve 106, an actuator system 108 and one or more sensing devices or sensors 110. As will be discussed, the valve 106 is movable by the actuator system 108 to direct an exhaust gas stream into a first portion of the dual catalyst system 102, a second portion of the dual catalyst system 102 or both the first portion and the second portion of the dual catalyst system 102. The actuator system 108 is controlled based on sensor signals received from the one or more sensors 110 and based on inputs provided from other modules associated with the vehicle 10. As a result of directing the exhaust gas stream to the first portion, the second portion or both the first portion and the second portion of the dual catalyst system 102, an efficiency of the dual catalyst system 102 is optimized for the removal of the combustion byproducts from the exhaust gas stream over a variety of operating conditions of the vehicle 10. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. The vehicle 10 is depicted in the illustrated embodiment as a passenger car, but it should be appreciated that any other vehicle including trucks, sport utility vehicles (SUVs), recreational vehicles (RVs), marine vessels, aircraft, etc., can also be used. As shown, the vehicle 10 generally includes a propulsion system 30, a transmission system 32, a steering system 34, a brake system 36, a communication system 38, a controller 40 and the dual after treatment system 100. The propulsion system 30 may, in various embodiments, include an internal combustion engine, such as a diesel engine, and portions of the dual after treatment system 100, as will be discussed with regard to FIG. 2.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling components associated with the vehicle 10.

The instructions may include one or more separate programs, each of which comprises an ordered listing of executable instructions for implementing logical functions. The instructions, when executed by the processor 44, receive and process signals, perform logic, calculations, methods and/or algorithms for controlling the components of the vehicle 10, and generate control signals to control the components of the vehicle 10 based on the logic, calculations, methods, and/or algorithms. Although only one controller 40 is shown in FIG. 1, embodiments of the vehicle 10 may include any number of controllers 40 that communicate over any suitable communication medium or a combination of communication mediums and that cooperate to process the sensor signals, perform logic, calculations, methods, and/or algorithms, and generate control signals to control features of the vehicle 10.

In various embodiments, one or more instructions of the controller 40 are associated with the dual after treatment system 100 and, when executed by the processor 44, the instructions receive and process signals from the one or more sensors 110 to determine various conditions associated with the operation of the dual catalyst system 102. For example, as will be discussed herein, the instructions of the controller 40, when executed by the processor 44, receive and process the sensor signals from the one or more sensors 110 and determine whether the temperature of the SCR system 104 is above or exceeds (i.e., is greater than) a pre-defined temperature threshold. The instructions of the controller 40, when executed by the processor 44, output control signals to the actuator system 108 to move the valve 106 based on the determination that the temperature associated with the SCR system 104 exceeds the pre-defined threshold. In various embodiments, the instructions of the controller 40, when executed by the processor 44, also receive and process the sensor signals from the one or more sensors 110 and output control signals to the actuator system 108 to move the valve 106 based on the processing. In various embodiments, the instructions of the controller 40, when executed by the processor 44, also output control signals to the actuator system 108 to move the valve 106 based on one or more inputs received from other modules associated with the vehicle 10.

Figure 2:
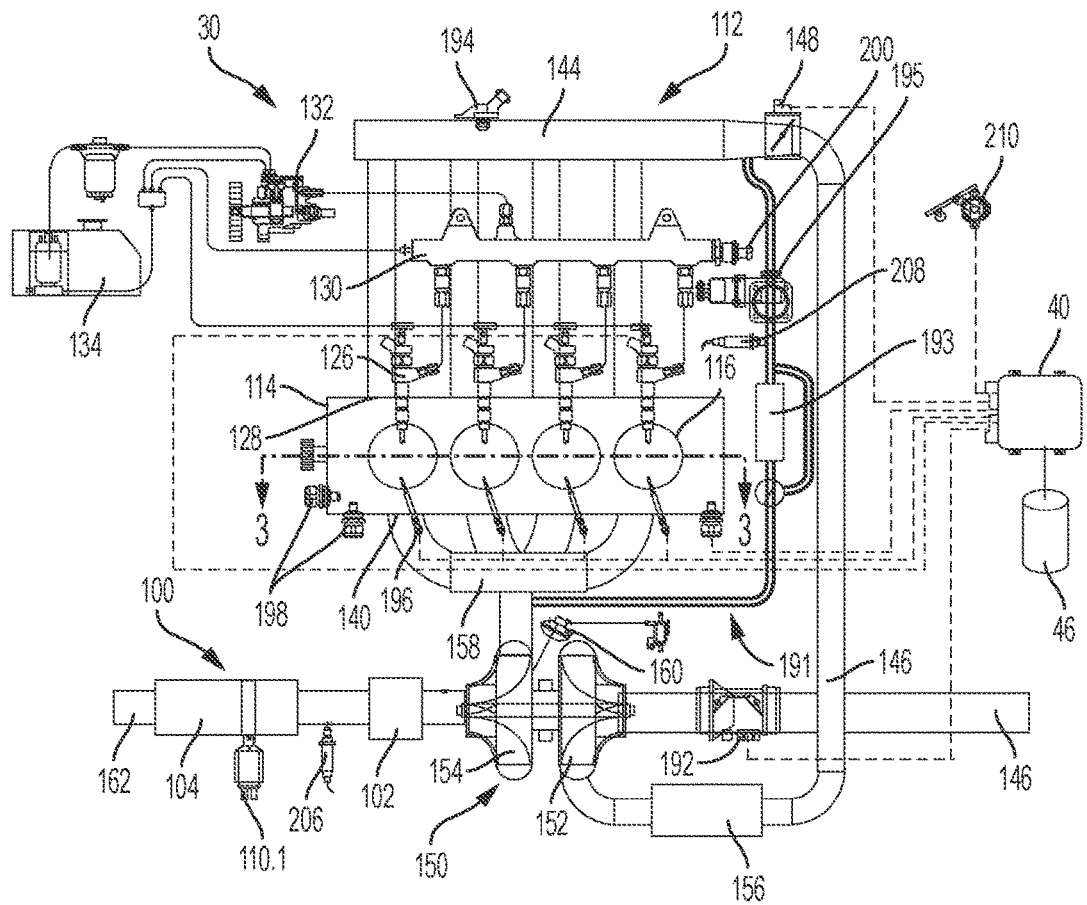
FIG. 2 schematically illustrates a propulsion system for the vehicle of FIG. 1 which includes a portion of the dual after treatment system, in accordance with various embodiments.
Figure 3:
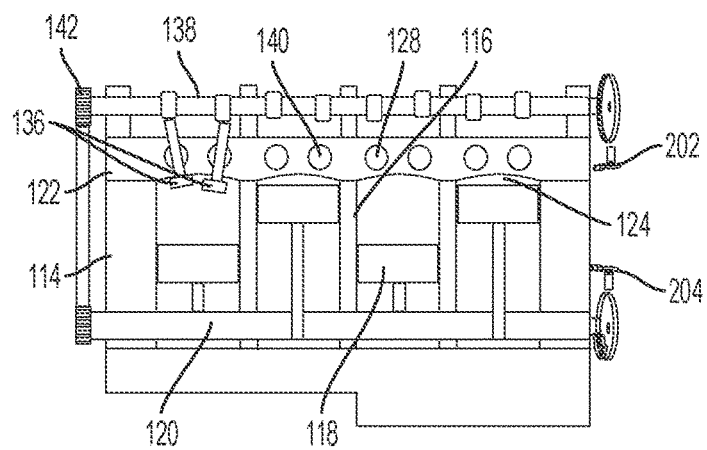
FIG. 3 is a cross-section taken along line 3-3 of FIG. 2, which illustrates the internal combustion engine of the propulsion system of FIG. 2, in accordance with various embodiments.

With reference to FIGS. 2 and 3, the propulsion system 30 is shown in greater detail. In one example, the propulsion system 30 is an internal combustion engine (ICE) 112, such as a diesel engine, having an engine block 114 defining at least one cylinder 116 having a piston 118 coupled to rotate a crankshaft 120. A cylinder head 122 cooperates with the piston 118 to define a combustion chamber 124. A fuel and air mixture is injected into the combustion chamber 124 and ignited, resulting in hot expanding exhaust gasses causing reciprocal movement of the piston 118. The fuel is provided by at least one fuel injector 126 and the air through at least one intake port 128. The fuel is provided at high pressure to the fuel injector 126 from a fuel rail 130 in fluid communication with a high pressure fuel pump 132 that increases the pressure of the fuel received from a fuel source 134. Each of the cylinders 116 has at least two valves 136, actuated by a camshaft 138 rotating in time with the crankshaft 120. The valves 136 selectively allow air into the combustion chamber 124 from the port 128 and alternately allow exhaust gases to exit through an exhaust port 140. In some examples, a cam phaser 142 may selectively vary the timing between the camshaft 138 and the crankshaft 120.

The air may be distributed to the air intake port(s) 128 through an intake manifold 144. An air intake duct 146 may provide air from the ambient environment to the intake manifold 144. In other embodiments, a throttle body 148 may be provided to regulate the flow of air into the intake manifold 144. In still other embodiments, a forced air system such as a turbocharger 150, having a compressor 152 rotationally coupled to a turbine 154, may be provided. Rotation of the compressor 152 increases the pressure and temperature of the air in the air intake duct 146 and intake manifold 144. An intercooler 156 disposed in the air intake duct 146 may reduce the temperature of the air. The turbine 154 rotates by receiving exhaust gases from an exhaust manifold 158 that directs exhaust gases from the exhaust ports 140 and through a series of vanes prior to expansion through the turbine 154. The exhaust gases exit the turbine 154 and are directed into the dual catalyst system 102 of the dual after treatment system 100. This example shows a variable geometry turbine (VGT) with a VGT actuator 160 arranged to move the vanes to alter the flow of the exhaust gases through the turbine 154. In other embodiments, the turbocharger 150 may be fixed geometry and/or include a waste gate.

Figure 4:
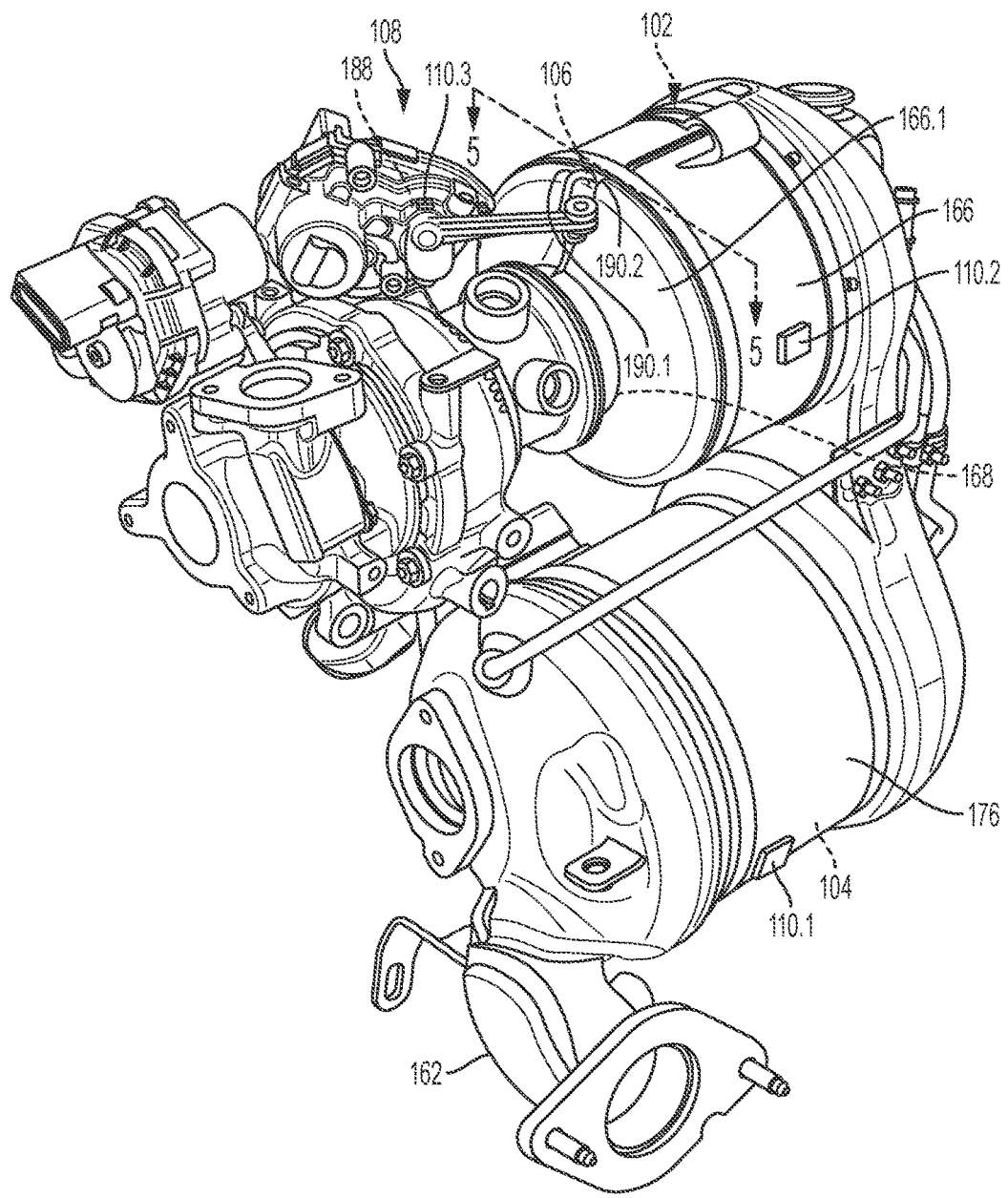
FIG. 4 is a detail perspective view of the propulsion system of FIG. 2, which illustrates the dual after treatment system.

With reference to FIG. 4, the dual after treatment system 100 is shown in greater detail. The dual catalyst system 102 includes an exhaust pipe 162 having the dual catalyst system 102 and the SCR system 104. The dual catalyst system 102 is a first after treatment device and the SCR system 104 is a second after treatment device of an exhaust system associated with the vehicle 10. The dual catalyst system 102 is disposed within a housing 166 and is fluidly coupled to the turbine 154 to receive the exhaust gas stream. Generally, the dual catalyst system 102 is upstream of the SCR system 104. The valve 106 is positionable by the actuator system 108 to direct the exhaust gas stream into a first portion of the dual catalyst system 102, a second portion of the dual catalyst system 102 or both.

Figure 5:
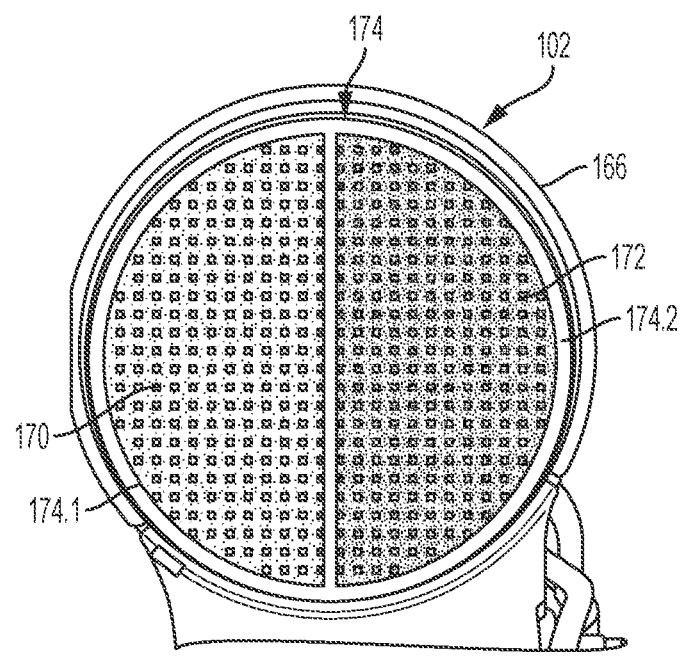
FIG. 5 is a cross-sectional view taken along line 5-5 of FIG. 4, which illustrates a dual catalyst system of the dual after treatment system of FIG. 4.

With reference to FIG. 5, the dual catalyst system 102 is shown in greater detail. The dual catalyst system 102 includes the first portion or a diesel oxidation catalyst (DOC) portion 170 and the second portion or a lean nitrogen oxide trap (LNT) portion 172. Generally, the DOC portion 170 and the LNT portion 172 are defined on respective halves 174.1, 174.2 of a cylindrical monolith substrate 174. In one example, the monolith substrate 174 for the catalysts is formed by extruding from a circle or oval shape to obtain an elongated substrate. The substrate is cut substantially into two halves 174.1, 174.2. Substantially one-half 174.1 of the monolith substrate 174 is coated with a DOC washcoat to form the DOC portion 170, and the second, opposite one-half 174.2 of the monolith substrate 174 is coated with an LNT washcoat and platinum group metals to define the LNT portion 172. The two-halves 174.1, 174.2 of the monolith substrate 174 are positioned next to each other within the housing 166 so as to be substantially parallel to each other to define the dual catalyst system 102, which is substantially circular. It should be noted that while the dual catalyst system 102 is described herein as being formed from two cut halves 174.1, 174.2 of the monolith substrate 174, the monolith substrate 174 may remain one-piece.

Figure 6:
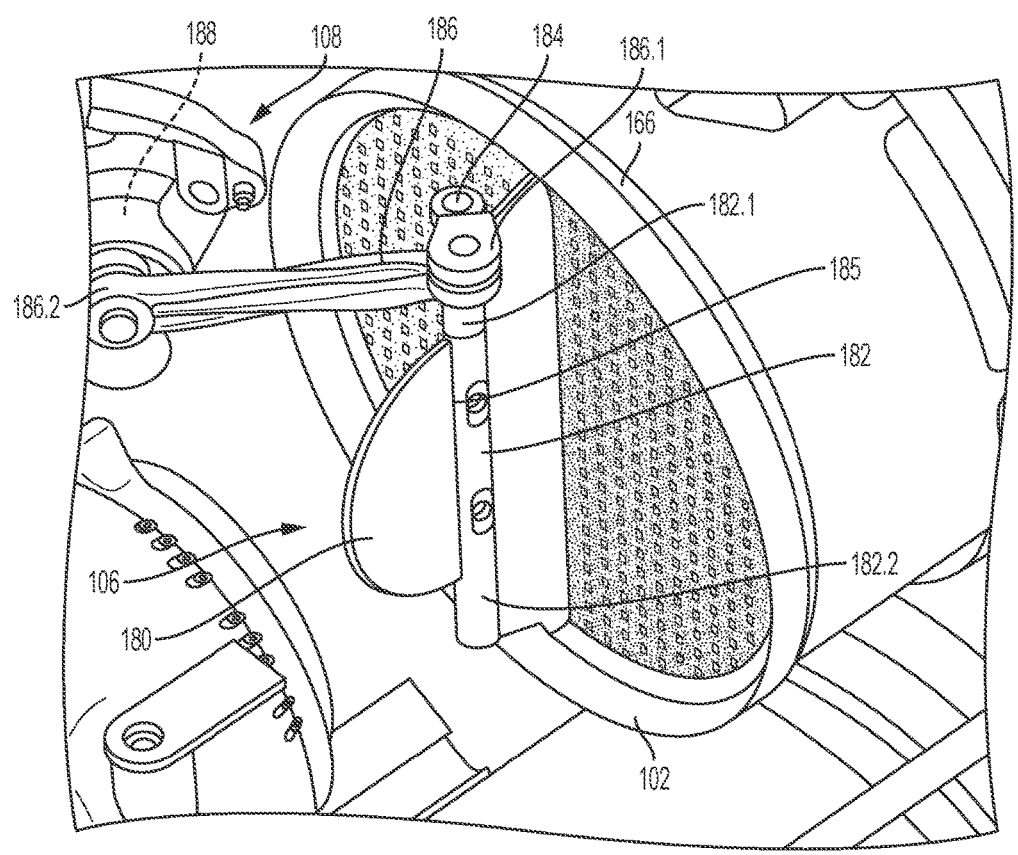
FIG. 6 is a partially expanded view of the dual catalyst system of the dual after treatment system of FIG. 4, in which a cover of a housing associated with the dual catalyst system is removed to illustrate a valve movable by an actuator system associated with the dual after treatment system.

With reference back to FIG. 4, in this example, the SCR system 104 is a diesel particulate filter (DPF), which is coated with a selective catalytic reduction (SCR) catalyst. The SCR system 104 is contained within a housing 176, and is downstream from the dual catalyst system 102. The valve 106 is coupled to an inlet 168 of the housing 166 of the dual catalyst system 102. The housing 166 may include a cover 166.1. With reference to FIG. 6, the cover 166.1 of the housing 166 is removed to show the valve 106 and the actuator system 108 in greater detail. In this example, the valve 106 has a valve flap 180 and a rod 182. The valve flap 180 is semi-circular, and is coupled along an end 185 to the rod 182. Generally, the valve flap 180 is sized to substantially prevent the flow of the exhaust gas stream into the DOC portion 170 or the LNT portion 172, while also enabling the exhaust gas to flow into both the DOC portion 170 and the LNT portion 172. Thus, the valve flap 180 is sized to enable the exhaust gas to flow into the DOC portion 170 only, the LNT portion 172 only or both the DOC portion 170 and the LNT portion 172.

The rod 182 is coupled to the valve flap 180 and to the actuator system 108. The rod 182 is pivotally mounted to the housing 166 at a first end 182.1 and a second end 182.2. The first end 182.1 includes a pin 184 for coupling the rod 182 to the actuator system 108. The actuator system 108 rotates the rod 182 to move the valve flap 180 between various positions. In one example, the actuator system 108 includes a linkage 186 and a motor 188. The linkage 186 is coupled at a first end 186.1 to the rod 182, and is coupled at an opposite second end 186.2 to the motor 188. In this example, the translation of the linkage 186 rotates the rod 182, thereby moving the valve flap 180. With brief reference to FIG. 4, a pair of limit stops 190 is defined on the cover 166.1 on either side of the inlet 168 to limit a range of motion for the valve flap 180. Generally, a first limit stop 190.1 defines a first position for the valve flap 180, and a second limit stop 190.2 defines a second position for the valve flap 180. It should be noted that other techniques may be employed to move the valve flap 180, and the use of the linkage 186 and the rod 182 is merely an example.

The motor 188 has an output shaft coupled to the linkage 186 via suitable gearing. The motor 188 is responsive to one or more control signals from the controller 40 to move the valve flap 180. In one example, the motor 188 is a direct current (DC) motor, which is in communication with the controller 40 over a communication medium that facilitates the transfer of power, commands, data, etc. such as a bus. The controller 40 also monitors a current of the motor 188. Generally, the current of the motor 188 spikes or increases when the linkage 186 contacts each of the pair of limit stops 190, which indicates the first position of the valve 106 or the second position of the valve 106 has been reached.

Figure 7:
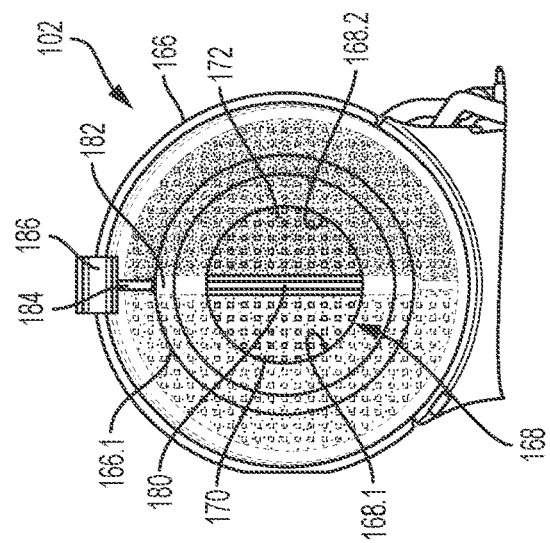
FIG. 7 is a detail side view similar to FIG. 6 in which the valve of the dual after treatment system is in a first position.
Figure 8:
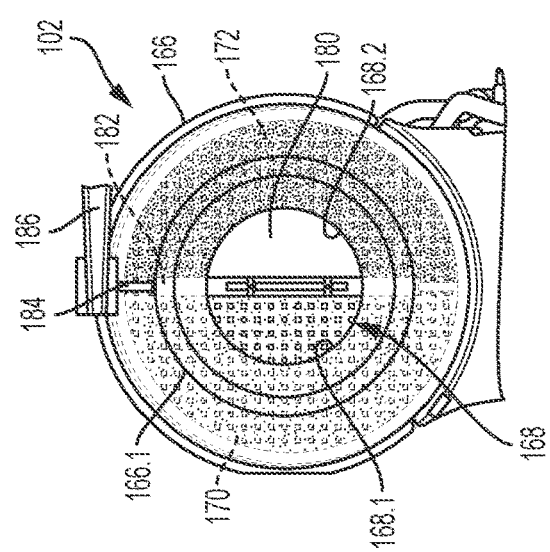
FIG. 8 is a detail side view similar to FIG. 6 in which the valve of the dual after treatment system is in a second position.
Figure 9:
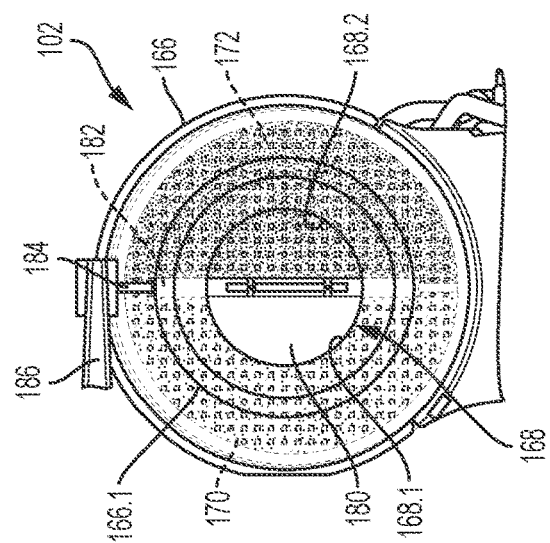
FIG. 9 is a side view similar to FIG. 6 in which the valve of the dual after treatment system is in a third position.

With reference to FIG. 7, the motor 188 is responsive to one or more control signals from the controller 40 to move the valve flap 180 of the valve 106 (by rotating the rod 182) to the first position in which the exhaust gas flows only through the LNT portion 172. In this first position, the valve flap 180 substantially covers a first inlet portion 168.1 of the inlet 168, which directs the exhaust gas stream into the LNT portion 172. Referring to FIG. 8, the motor 188 is also responsive to one or more control signals from the controller 40 to move the valve flap 180 of the valve 104 to the second position (by rotating the rod 182) in which the exhaust gas flows only through the DOC portion 170. In this second position, the valve flap 180 substantially covers a second inlet portion 168.2 of the inlet 168, which directs the exhaust gas stream into the DOC portion 170. With reference to FIG. 9, the motor 188 is also responsive to one or more control signals from the controller 40 to move the valve flap 180 of the valve 104 to a third position (by rotating the rod 182) in which the exhaust gas flows through the DOC portion 170 and the LNT portion 172. In this third position, the valve flap 180 is positioned in the middle of the first inlet portion 168.1 and the second inlet portion 168.2 of the inlet 168, so as to extend outwardly into the flow of the exhaust gas stream, which enables the exhaust gas stream to flow into both the DOC portion 170 and the LNT portion 172.

With reference to FIG. 4, the sensors 110 observe conditions associated with the dual after treatment system 100 and generate sensor signals based thereon. In one example, the sensors 110 include a first temperature sensor 110.1, a second, load sensor 110.2 and a third, position sensor 110.3. The first sensor 110.1 is coupled to the SCR system 104 and observes a condition of the SCR system 104. In one example, the first sensor 110.1 observes an operating temperature of the SCR system 104 and generates sensor signals based on the observation. The second sensor 110.2 is coupled to the LNT portion 172 and observes a condition of the LNT portion 172. In one example, the second sensor 110.2 observes an amount of particulate loading of the LNT portion 172 and generates sensor signals based thereon. It should be noted that the second sensor 110.2 is merely exemplary, as the amount of particulate loading of the LNT portion 172 may also be determined by modeling based on an amount of exhaust gas flow over a period of time, for example. The third sensor 110.3 observes a condition of the motor 188 and generates sensor signals based on the observation. In one example, the third sensor 110.3 is a rotary encoder that observes a position of the output shaft of the motor 188 and generates sensor signals based thereon. The sensors 110 are in communication with the controller 40 via a communication medium or bus that facilitates the transfer of power, data, commands, etc.

With reference back to FIG. 2, the propulsion system 30 may include in various embodiments a high pressure exhaust gas recirculation (EGR) system 191 coupled between the exhaust manifold 158 and the intake manifold 144. The EGR system 191 may include an EGR cooler 193 to reduce the temperature of the exhaust gases in the EGR system 191. An EGR valve 195 regulates a flow of exhaust gases in the EGR system 191.

The propulsion system 30 may also include one or more sensors and/or devices associated with the ICE 112, which are in communication with the controller 40 over a communication medium that facilitates the transfer of power, data, commands, etc. The controller 40 may receive input signals from various sensors configured to generate the signals in proportion to various physical parameters associated with the ICE 112. The sensors include, but are not limited to, a mass airflow and temperature sensor 192, a manifold pressure and temperature sensor 194, a combustion pressure sensor 196, coolant and oil temperature and level sensors 198, a fuel rail pressure sensor 200, a cam position sensor 202, a crank position sensor 204, exhaust pressure sensors 206, an EGR temperature sensor 208, and an accelerator pedal position sensor 210. Furthermore, the controller 40 may generate output signals to various control devices that are arranged to control the operation of the ICE 112, including, but not limited to, the fuel injectors 126, the throttle body 148, the EGR valve 195, the VGT actuator 160, and the cam phaser 142. Note, dashed lines are used to indicate communication between the controller 40 and the various sensors and devices, but some are omitted for clarity.

As discussed above, the dual after treatment system 100 receives sensor signals from the one or more sensors 110 and inputs from other control modules associated with the vehicle 10, and determines what position to move the valve 106 to (e.g., the first position, the second position or the third position). The dual after treatment system 100 generates and outputs one or more control signals for the motor 188 to move the valve flap 180 based on this determination. The dual after treatment system 100 also performs a calibration routine to learn the positions of the valve flap 180 to determine the movement of the motor 188 to position the valve flap 180 in the first position, the second position and the third position.

Figure 10:
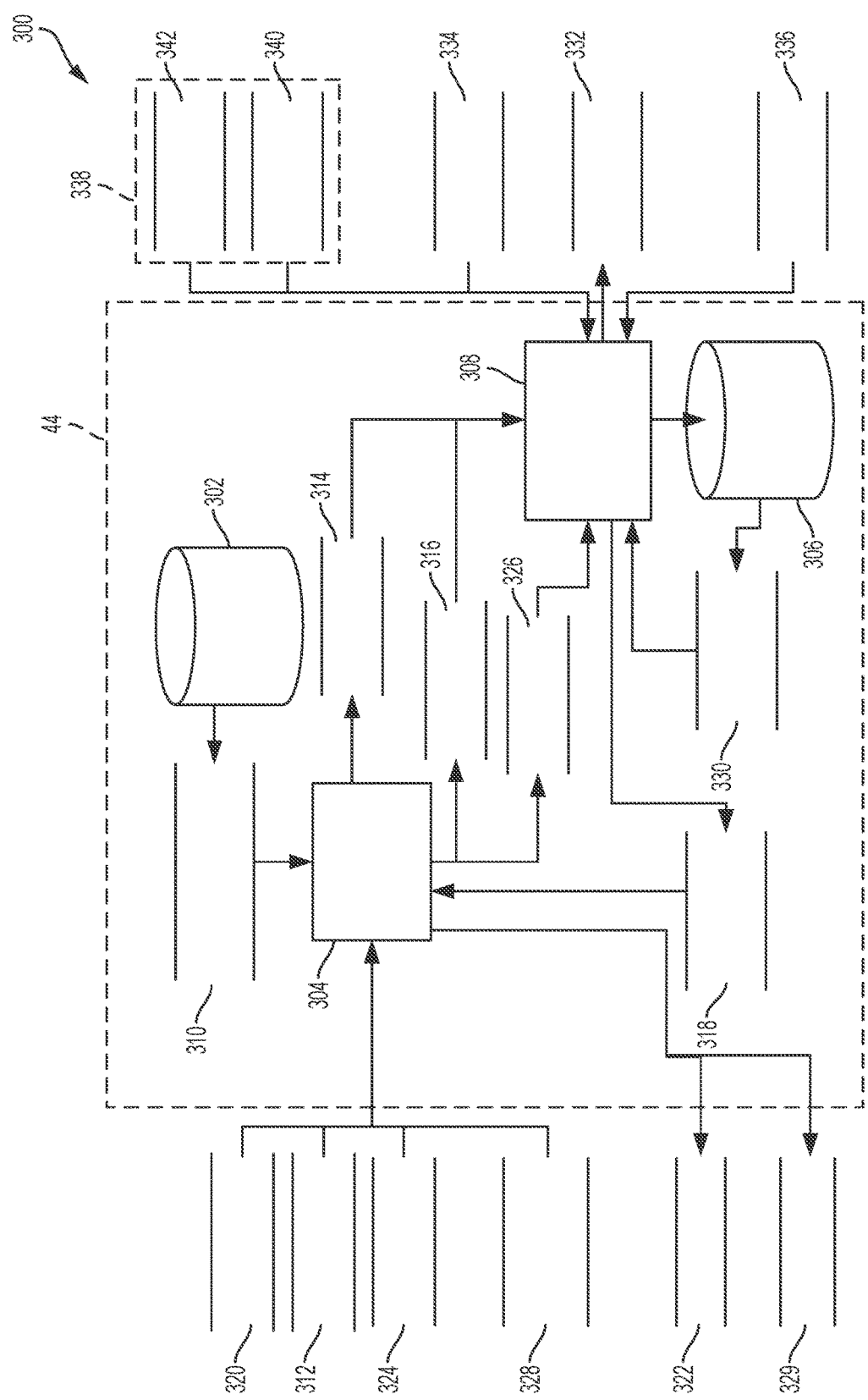
FIG. 10 is a dataflow diagram illustrating a control system of the dual after treatment system of the vehicle of FIG. 1, in accordance with various embodiments.

For example, as shown in more detail with regard to FIG. 10 and with continued reference to FIGS. 1-9, a dataflow diagram illustrates various embodiments of a control system 300 for the dual after treatment system 100 of the vehicle 10, which may be embedded within the controller 40. Various embodiments of the control system 300 of the dual after treatment system 100 according to the present disclosure can include any number of sub-modules embedded within the controller 40. As can be appreciated, the sub-modules shown in FIG. 10 can be combined and/or further partitioned to similarly control the motor 188, and thus, the valve 106. Inputs to the dual after treatment system 100 may be received from the sensors 110 (FIG. 4), received from other control modules associated with the vehicle 10, and/or determined/modeled by other sub-modules within the controller 40. In various embodiments, the dual after treatment system 100 includes a threshold datastore 302, an LNT/DOC monitor module 304, a position datastore 306 and a motor control module 308.

The threshold datastore 302 stores data that indicates a threshold for a temperature observed by the sensor 110.1; a threshold for loading observed by the sensor 110.2; and a threshold for a load of the ICE 112 (i.e. a threshold for engine load). Thus, the threshold datastore 302 stores one or more threshold data values 310, which provide a pre-defined threshold for a temperature of the SCR system 104; a pre-defined threshold for an amount of loading of the LNT portion 172; and a pre-defined threshold for the load of the ICE 112 (i.e. engine load). In one example, the first pre-defined threshold for the temperature observed by the first sensor 110.1 is about 200 degrees Celsius. The pre-defined threshold for the amount of loading of the LNT portion 172 is about 90% loaded. The pre-defined threshold for the load of the ICE 112 is a pre-defined value based on the operating characteristics and operating parameters associated with the particular ICE 112. Each of the thresholds are pre-defined values based on a default or predetermined value (e.g., factory set). It should be understood that the use of threshold data values 310 is merely exemplary. In this regard, a look-up table may be stored in the threshold datastore 302, which correlates a particular temperature to a position for the valve 106. In addition, a look-up table may be stored in the threshold datastore 302 that indicates an amount of loading of the LNT portion 172 based on an amount of flow of the exhaust gas stream, for example.

The LNT/DOC monitor module 304 receives as input temperature sensor data 312. The temperature sensor data 312 is the sensor signals received from the first sensor 110.1. The LNT/DOC monitor module 304 processes the sensor signals received as the temperature sensor data 312 and determines a temperature of the SCR system 104. The LNT/DOC monitor module 304 queries the threshold datastore 302 and retrieves the threshold data value 310 for the pre-defined temperature threshold for the temperature of the SCR system 104. The LNT/DOC monitor module 304 compares the determined temperature of the SCR system 104 to the threshold data value 310 for the temperature, and determines whether the temperature of the SCR system 104 exceeds or is greater than the threshold data value 310 for the temperature of the SCR system 104. If the temperature of the SCR system 104 exceeds or is greater than the threshold data value 310 for the temperature of the SCR system 104, the LNT/DOC monitor module 304 sets DOC position 314 for the motor control module 308. If the temperature of the SCR system 104 is below or less than the threshold data value 310 for the temperature of the SCR system 104, the LNT/DOC monitor module 304 sets LNT position 316 for the motor control module 308. The DOC position 314 is a command to move the valve 106 to the second position to direct the exhaust gas stream into the DOC portion 170. The LNT position 316 is a command to move the valve 106 to the first position to direct the exhaust gas stream into the LNT portion 172.

The LNT/DOC monitor module 304 receives as input valve position 318. The valve position 318 is a current position of the valve 106, such as the first position (LNT portion 172 only), the second position (DOC portion 170 only) or the third position (DOC portion 170 and LNT portion 172), which is received from the motor control module 308 and may be stored in a memory associated with the LNT/DOC monitor module 304. Based on the valve position 318 indicating that the valve 106 is in the first position (LNT portion 172 only), the LNT/DOC monitor module 304 receives as input load sensor data 320. The load sensor data 320 is the sensor signals received from the sensor 110.2. The LNT/DOC monitor module 304 processes the sensor signals and determines a loading of the LNT portion 172. The LNT/DOC monitor module 304 queries the threshold datastore 302 and retrieves the threshold data value 310 for the pre-defined threshold of loading of the LNT portion 172. The LNT/DOC monitor module 304 compares the determined loading of the LNT portion 172 to the threshold data value 310 for the loading of the LNT portion 172, and determines whether the loading of the LNT portion 172 exceeds or is greater than the threshold data value 310 for the loading of the LNT portion 172. If true, the LNT/DOC monitor module 304 outputs de-NOx data 322. The de-NOx data 322 is a command for another control module of the vehicle 10, such as an engine control module, to perform a de-NOx event to regenerate the LNT portion 172.

Based on the valve position as the second position (DOC portion 170 only), the LNT/DOC monitor module 304 also receives as input engine load data 324. The engine load data 324 is a current load of the ICE 112, which is received from other control modules associated with the vehicle 10, such as the engine control module. The current load of the ICE 112 may be calculated by the other control modules associated with the vehicle based on engine speed and torque. The LNT/DOC monitor module 304 queries the threshold datastore 302 and retrieves the threshold data value 310 for the pre-defined threshold of the load of the ICE 112. The LNT/DOC monitor module 304 compares the received engine load data 324 to the threshold data value 310 for the load of the ICE 112, and determines whether the current load of the ICE 112 exceeds or is greater than the threshold data value 310 for the load of the ICE 112. If true, the LNT/DOC monitor module 304 sets LNT and DOC position 326 for the motor control module 308. The LNT and DOC position 326 is a command to move the valve 106 to the third position to direct the exhaust gas stream into the DOC portion 170 and the LNT portion 172.

Based on the valve position as the second position (DOC portion 170 only), the LNT/DOC monitor module 304 also receives as input DPF regeneration data 328. The DPF regeneration data 328 is a notification that the DPF of the SCR system 104 is to be regenerated, which is received from other control modules associated with the vehicle 10, such as the engine control module. Based on the notification that the DPF is to be regenerated, the LNT/DOC monitor module 304 sets the LNT and DOC position 326 for the motor control module 308.

Based on the valve position as the second position (DOC portion 170 only), the LNT/DOC monitor module 304 also outputs DEF injection data 329. The DEF injection data 329 is a command to other control modules associated with the vehicle 10 to inject diesel exhaust fluid (DEF) into the exhaust gas flow prior to the exhaust gas flow reaching the SCR system 104.

The position datastore 306 stores data indicating position values 330 for the motor 188 to move the valve 106 between the first position, the second position and the third position. Stated another way, the position datastore 306 stores a look-up table that provides an amount of movement of the output shaft for the motor 188 to position the valve flap 180 of the valve 106 in each of the first position, the second position and the third position. In one embodiment, the look-up table is populated by the motor control module 308. In other embodiments, the look-up table may contain pre-defined or factory set position values 330.

The motor control module 308 populates the position datastore 306 by a calibration routine. In one example, the motor control module 308 outputs one or more control signals 332. The one or more control signals 332 actuate the motor 188 to move the linkage 186. The motor control module 308 receives as input current data 334. The current data 334 indicates a current of the motor 188. The motor control module 308 monitors the current of the motor 188 until an increase or spike in the current is observed that indicates that the linkage 186 has contacted the limit stop 190.2. Based on this observation, the motor control module 308 receives as input position sensor data 336. The position sensor data 336 is the sensor signals from the third sensor 110.1. The motor control module 308 processes the position sensor data 336 and determines the position of the output shaft of the motor 188. The motor control module 308 associates this position of the output shaft of the motor 188 as the position value 330 for the second position, and stores this association in the position datastore 306.

Based on the determination of the second position, the motor control module 308 outputs the one or more control signals 332. The one or more control signals 332 actuate the motor 188 to move the linkage 186, and thus, the valve 106 from the second position toward the limit stop 190.1. The motor control module 308 receives as input the current data 334. The motor control module 308 monitors the current of the motor 188 until an increase or spike in the current is observed that indicates the linkage 186 has contacted the limit stop 190.1. Based on this observation, the motor control module 308 receives as input position sensor data 336. The motor control module 308 processes the position sensor data 336 and determines the position of the output shaft of the motor 188. The motor control module 308 associates this position of the output shaft of the motor 188 as the position value 330 for the first position, and stores this association in the position datastore 306.

Based on the determined first position and second position, the motor control module 308 determines the third position, in which the valve flap 180 of the valve 106 is positioned substantially half-way between the first position and the second position. In one example, the motor control module 308 subtracts the position value 330 for the first position from the position value 330 for the second position and divides this result by two to arrive at the substantially half-way position of the output shaft of the motor 188. The motor control module 308 associates the substantially half-way position as the position value 330 for the third position, and stores this association in the position datastore 306.

The motor control module 308 receives as input engine data 338 regarding the ICE 112, which is received from other control modules associated with the vehicle 10, such as the engine control module. In one example, the engine data 338 includes a startup command 340 and a shutdown command 342. Based on the startup command 340, the motor control module 308 queries the position datastore 306 and retrieves the position value 330 associated with the first position (LNT portion 172 only). The motor control module 308 outputs the one or more control signals 332 to move the motor 188 to the position associated with the first position of the valve 106. The motor control module 308 sets the valve position 318 for the LNT/DOC monitor module 304 as the first position.

Based on the shutdown command 342, the motor control module 308 queries the position datastore 306 and retrieves the position value 330 associated with the third position (DOC portion 170 and LNT portion 172). The motor control module 308 outputs the one or more control signals 332 to drive the output shaft of the motor 188 to the position associated with the third position of the valve 106. The motor control module 308 sets the valve position 318 for the LNT/DOC monitor module 304 as the third position.

The motor control module 308 receives as input the DOC position 314. Based on the DOC position 314, the motor control module 308 queries the position datastore 306 and retrieves the position value 330 associated with the second position (DOC portion 170 only). The motor control module 308 outputs the one or more control signals 332 to drive the output shaft of the motor 188 to the position associated with the second position of the valve 106. The motor control module 308 sets the valve position 318 for the LNT/DOC monitor module 304 as the second position.

The motor control module 308 receives as input the LNT position 316. Based on the LNT position 316, the motor control module 308 queries the position datastore 306 and retrieves the position value 330 associated with the first position (LNT portion 172 only). The motor control module 308 outputs the one or more control signals 332 to drive the output shaft of the motor 188 to the position associated with the first position of the valve 106. The motor control module 308 sets the valve position 318 for the LNT/DOC monitor module 304 as the first position.

The motor control module 308 receives as input the LNT and DOC position 326. Based on the LNT and DOC position 326, the motor control module 308 queries the position datastore 306 and retrieves the position value 330 associated with the third position (DOC portion 170 and LNT portion 172). The motor control module 308 outputs the one or more control signals 332 to drive the output shaft of the motor 188 to the position associated with the third position of the valve 106. The motor control module 308 sets the valve position 318 for the LNT/DOC monitor module 304 as the third position.

Figure 11:
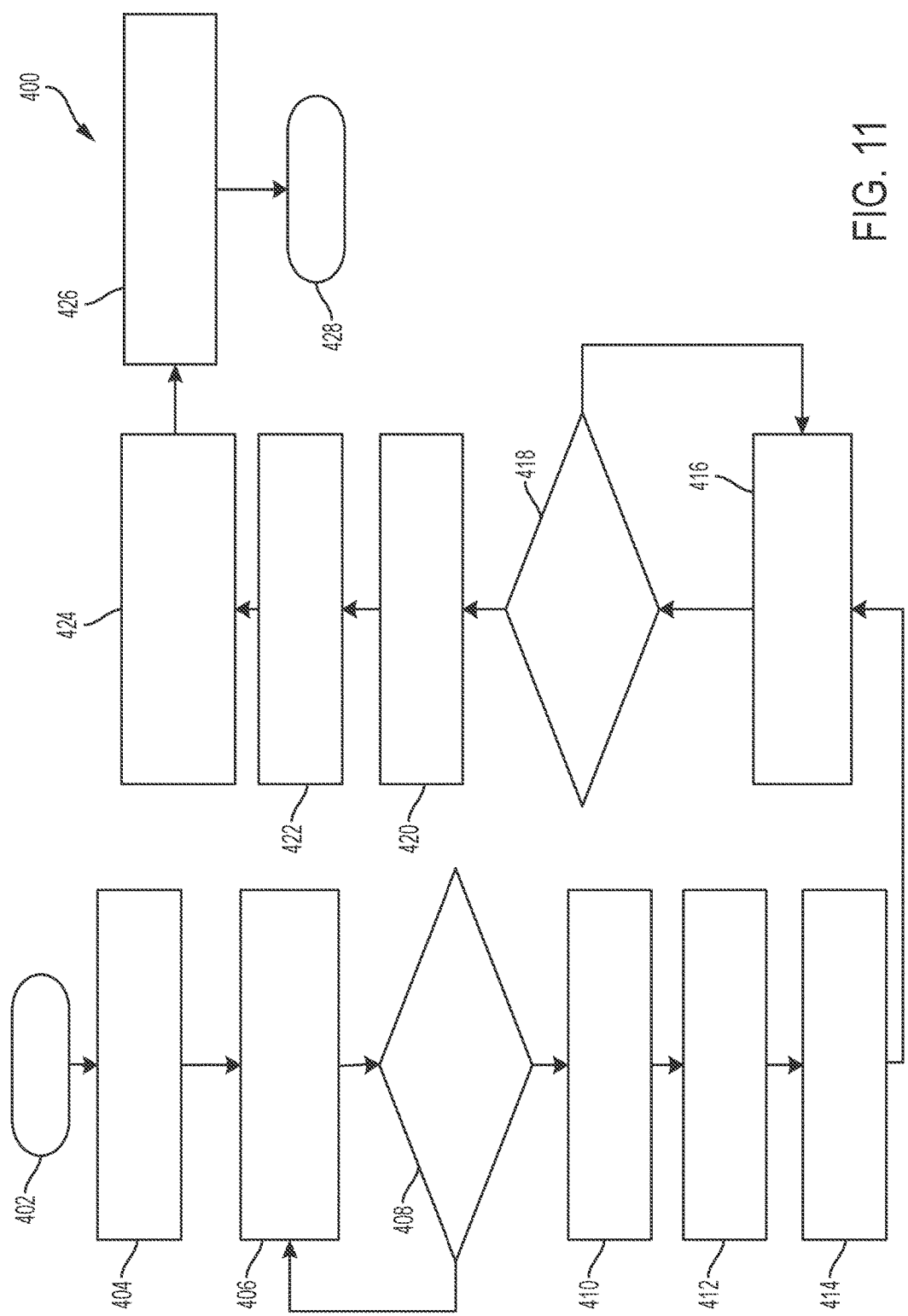
FIG. 11 is a flowchart illustrating a calibration method that is performed by the dual after treatment system of the vehicle of FIG. 1, in accordance with various embodiments.

Referring now to FIG. 11, and with continued reference to FIGS. 1-10, a flowchart illustrates a calibration method 400 that can be performed by the dual aftertreatment system 100 of FIGS. 1-10 to calibrate the motor 188 to position the valve 106 in accordance with the present disclosure. In various embodiments, the calibration method 400 is performed by the processor 44 of the controller 40. As can be appreciated in light of the disclosure, the order of operation within the method is not limited to the sequential execution as illustrated in FIG. 11, but may be performed in one or more varying orders as applicable and in accordance with the present disclosure. In various embodiments, the calibration method 400 can be scheduled to run based on one or more predetermined events, and/or can run during an initial start-up of the vehicle 10.

The method begins at 402. At 404, the method outputs the one or more control signals 332 to the motor 188 to move the valve 106 toward the limit stop 190.2. At 406, the method receives and processes the current data 334. At 408, the method determines whether the current of the motor 188 has increased, which indicates that the linkage 186 has contacted the limit stop 190.2. If false, the method loops to 406.

If the current has increased, at 410, the method receives and processes the position sensor data 336 received from the third sensor 110.3 to determine the position of the output shaft of the motor 188. At 412, the method associates the determined position of the output shaft of the motor 188 with the second position (DOC portion 170 only) and stores this association in the position datastore 306. At 414, the method outputs the one or more control signals 332 to move the motor 188 toward the limit stop 190.1. At 416, the method receives and processes the current data 334. At 418, the method determines whether the current of the motor 188 has increased, which indicates that the linkage 186 has contacted the limit stop 190.1. If false, the method loops to 410.

If the current has increased, at 420, the method receives and processes the position sensor data 336 received from the third sensor 110.3 to determine the position of the output shaft of the motor 188. At 422, the method associates the determined position of the output shaft of the motor 188 with the first position (LNT portion 172 only) and stores this association in the position datastore 306. At 424, the method determines the substantially half-way position between the position of the output shaft of the motor 188 at the first position of the valve 106 and the position of the output shaft of the motor 188 at the second position of the valve 106. In one example, the method subtracts the position of the output shaft of the motor 188 at the first position of the valve 106 from the position of the output shaft of the motor 188 at the second position of the valve 106, and divides the result by two to arrive at the position of the output shaft of the motor 188 for a halfway position or the third position of the valve 106. At 426, the method associates the determined half-way position with the third position of the valve 106, and stores this association in the position datastore 306. The calibration method ends at 428.

Figure 12:
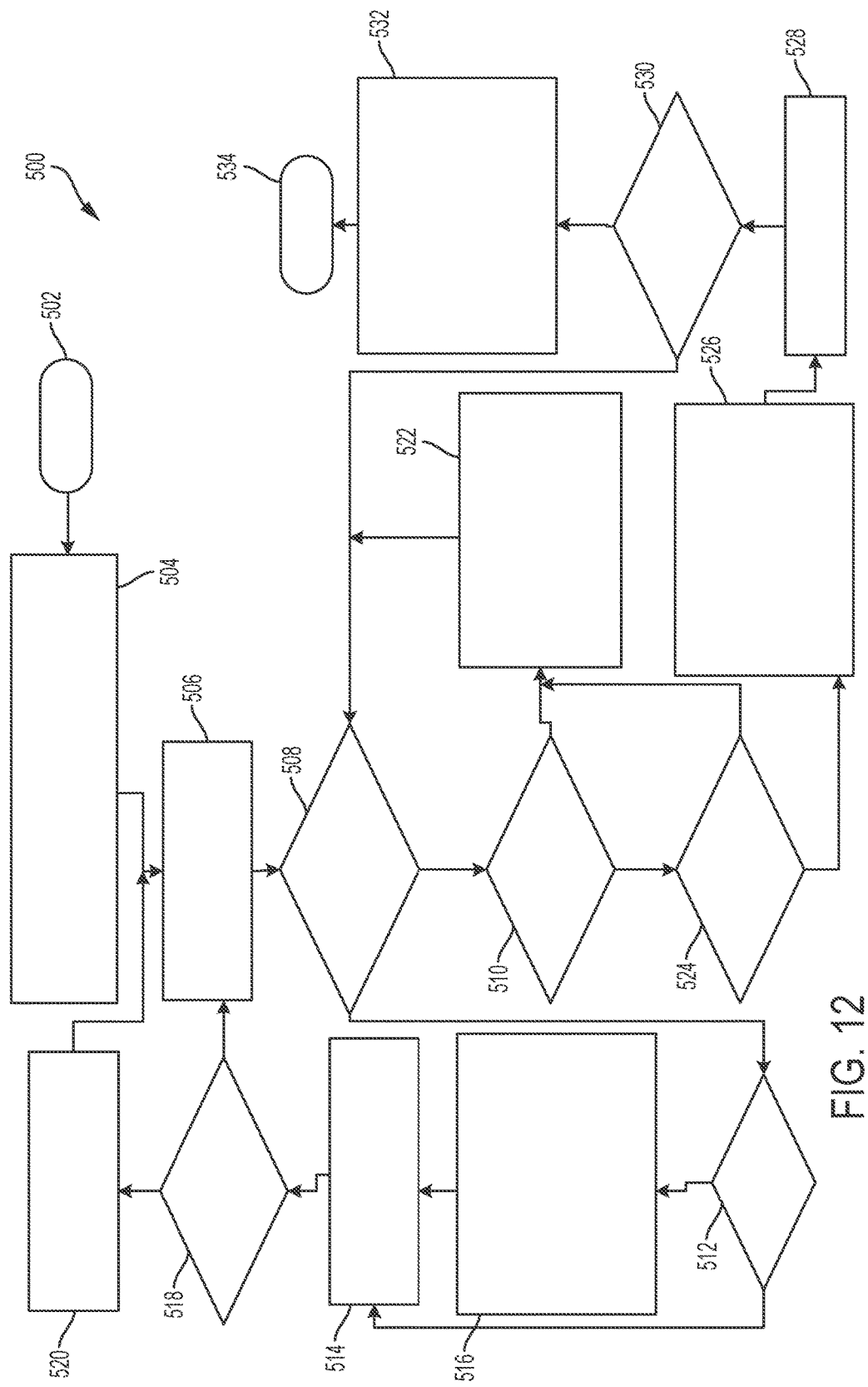
FIG. 12 is a flowchart illustrating a control method that is performed by the dual after treatment system of the vehicle of FIG. 1, in accordance with various embodiments.

Referring now to FIG. 12, and with continued reference to FIGS. 1-10, a flowchart illustrates a control method 500 that can be performed by the dual after treatment system 100 of FIGS. 1-10 to control the motor 188 to position the valve 106 in accordance with the present disclosure. In various embodiments, the control method 500 is performed by the processor 44 of the controller 40. As can be appreciated in light of the disclosure, the order of operation within the method is not limited to the sequential execution as illustrated in FIG. 12, but may be performed in one or more varying orders as applicable and in accordance with the present disclosure. In various embodiments, the control method 500 can be scheduled to run based on one or more predetermined events, and/or can run continuously during the operation of the vehicle 10.

The method begins at 502. At 504, the method receives the startup command 340. The method queries the position datastore 306 and retrieves the position value 330 associated with the first position (LNT portion 172 only). Based on the position value 330, the method outputs the one or more control signals 332 to the motor 188 to move the valve 106 to the first position such that the exhaust gas stream flows only through the LNT portion 172 and sets the current valve position as the first position. At 506, the method receives and processes the sensor signals from the first sensor 110.1 (i.e. temperature sensor data) to determine the current temperature of the SCR system 104. At 508, the method queries the threshold datastore 302 and retrieves the threshold data value 310 for the temperature of the SCR system 104. The method compares the determined current temperature of the SCR system 104 with the threshold data value 310 for the temperature of the SCR system 104. The method determines whether the current temperature of the SCR system 104 exceeds or is greater than the threshold data value 310 for the temperature of the SCR system 104. If true, the method proceeds to 510.

Otherwise, if the current temperature of the SCR system 104 is below or less than the threshold data value 310 for the temperature of the SCR system 104, at 512, the method determines whether the current valve position is the first position (LNT portion 172 only) based on the set valve position. If true, the method proceeds to 514. If the current valve position is not the first position, at 516, the method queries the position datastore 306 and retrieves the position value 330 associated with the first position. The method outputs the one or more control signals 332 to the motor 188 to move the valve 106 to the first position (LNT portion 172 only) and updates the current valve position as the first position.

At 514, the method receives and processes the sensor signals from the second sensor 110.2 (i.e. load sensor data 320) to determine the loading of the LNT portion 172. At 518, the method queries the threshold datastore 302 and retrieves the threshold data value 310 for the loading of the LNT portion 172. The method compares the determined loading of the LNT portion 172 with the threshold data value 310 for the loading of the LNT portion 172. The method determines whether the current loading of the LNT portion 172 exceeds or is greater than the threshold data value 310 for the loading of the LNT portion 172. If the current loading of the LNT portion 172 exceeds or is greater than the threshold data value 310, the method proceeds to 520. Otherwise, the method proceeds to 506.

At 520, the method outputs the de-NOx data 322, which instructs another control module associated with the vehicle 10, such as the engine control module, to perform a de-NOx event to regenerate the LNT portion 172. The method loops back to 506 and proceeds through 508 as previously described.

Based on the current temperature of the SCR system 104 exceeding or being greater than the threshold data value 310 for the temperature of the SCR system 104, at 510, the method receives and processes the engine load data 324 to determine the current load of the ICE 112. The method queries the threshold datastore 302 and retrieves the threshold data value 310 for the load of the ICE 112. The method compares the determined current load of the ICE 112 with the threshold data value 310 for the load of the ICE 112. The method determines whether the current load of the ICE 112 exceeds or is greater than the threshold data value 310 for the load of the ICE 112. If true, the method proceeds to 522.

Otherwise, at 524, the method determines whether the DPF regeneration data 328 has been received from other control modules associated with the vehicle 10 that indicates that the DPF is to undergo regeneration. If true, the method proceeds to 522.

Otherwise, if false, at 526, the method queries the position datastore 306 and retrieves the position value 330 associated with the second position (DOC portion 170 only). Based on the position value 330, the method outputs the one or more control signals 332 to the motor 188 to move the valve 106 to the second position such that the exhaust gas stream flows only through the DOC portion 170 and updates the current valve position as the second position. At 528, the method outputs the DEF injection data 329, to instruct the other control module associated with the vehicle 10 to perform the DEF injection to inject urea into the exhaust before the SCR system 104. At 530, the method determines whether the shutdown command 342 has been received. If the shutdown command 342 has not been received, the method proceeds to 508. Otherwise, at 532, the method queries the position datastore 306 and retrieves the position value 330 associated with the third position (DOC portion 170 and LNT portion 172). Based on the position value 330, the method outputs the one or more control signals 332 to the motor 188 to move the valve 106 to the third position such that the exhaust gas stream flows through both the DOC portion 170 and LNT portion 172, and updates the current valve position as the third position. The method ends at 534.

As previously noted, if either query at 510 or 524 are true, the method proceeds to 522. At 522, the method queries the position datastore 306 and retrieves the position value 330 associated with the third position (DOC portion 170 and LNT portion 172) and updates the current valve position as the third position. The method proceeds to 508.

Thus, the dual after treatment system 100 provides for an efficient reduction in combustion byproducts through the dual catalyst system 102. In this regard, by utilizing the LNT portion 172 during low operating temperatures of the SCR system 104, the LNT portion 172 is more efficient at storing combustion byproducts, such as nitrogen oxides, than the SCR system 104 in low operating temperatures. By utilizing the DOC portion 170 during high operating temperatures of the SCR system 104, the DOC portion 170 in combination with the SCR system 104 are more efficient at storing combustion byproducts, such as nitrogen oxides, than the LNT portion 172 during high operating temperatures. Moreover, by allowing the exhaust gas stream to flow through both the LNT portion 172 and the DOC portion 170 during high loads of the ICE 112 and/or during a regeneration of the DPF, it provides an easier path for the exhaust gas flow to travel, which improves performance of the ICE 112.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a valve for directing an exhaust gas stream through an exhaust duct having a first after treatment device and a second after treatment device in an exhaust system of a vehicle, the method comprising:
    receiving, by a processor, first sensor signals from a first sensor coupled to the second after treatment device, the second after treatment device downstream from the first after treatment device;
    processing, by the processor, the first sensor signals to determine a temperature of the second after treatment device;
    determining, by the processor, a position for the valve based on whether the temperature exceeds a pre-defined threshold for the temperature of the second after treatment device;
    outputting, by the processor, a control signal to an actuator system to move the valve to a first position in which the exhaust gas stream flows through a first portion of the first after treatment device or a second position in which the exhaust gas stream flows through a second portion of the first after treatment device based on the temperature of the second after treatment device;
    receiving, by the processor, a shutdown command to shutdown an engine associated with the vehicle; and
    outputting, by the processor, the control signal to the actuator system to move the valve to a third position in which the exhaust gas stream flows through both the first portion and the second portion of the first after treatment device based on the shutdown command.

2. The method of claim 1, wherein the outputting the control signal to the actuator system to move the valve further comprises:
    determining, by the processor, the position for the valve based on the temperature exceeding the pre-defined threshold and a current valve position as the first position; and
    outputting, by the processor, the control signal to move the valve to the second position.

3. The method of claim 2, wherein the outputting the control signal to the actuator system to move the valve to the second position further comprises:
    determining, by the processor, a current load of an engine of the vehicle exceeds a pre-defined threshold for the load of the engine; and
    outputting, by the processor, the control signal to move the valve to a third position in which the exhaust gas stream flows through both the first portion and the second portion of the first after treatment device.

4. The method of claim 2, wherein the outputting the control signal to the actuator system to move the valve to the second position further comprises:
    determining, by the processor, a performance of a regeneration of a diesel particulate filter associated with the second after treatment device; and
    outputting, by the processor, the control signal to move the valve to a third position in which the exhaust gas stream flows through both the first portion and the second portion of the first after treatment device.

5. The method of claim 2, wherein based on the current valve position as the second position, the method further comprises:
    outputting a signal to inject diesel exhaust fluid into the exhaust gas stream.

6. The method of claim 1, further comprising:
    receiving, by the processor, a startup command to start an engine associated with the vehicle; and
    outputting, by the processor, the control signal to the actuator system to move the valve to the first position based on the start-up command.

7. The method of claim 1, wherein based on the first temperature as below the pre-defined threshold, the outputting the control signal to the actuator system to move the valve further comprises:
    determining, by the processor, a loading of the second portion with combustion byproducts; and
    outputting, by the processor, a de-nitrogen oxide command to regenerate the second portion of the first after treatment device based on the determined loading of the second portion.

8. A control system for an exhaust system having a first after treatment device and a second after treatment device in an exhaust pipe of a vehicle, the control system comprising:
    a first sensor coupled to the second after treatment device configured to observe a temperature of the second after treatment device and generate sensor signals based on the observation, the second after treatment device downstream from the first after treatment device;
    a valve coupled to the first after treatment device that is movable between a first position in which the exhaust gas stream flows through a first portion of the first after treatment device or a second position in which the exhaust gas stream flows through a second portion of the first after treatment device;
    an actuator system coupled to the valve and configured to move the valve between the first position and the second position; and
    a controller, having a processor, configured to:
        process the sensor signals to determine a temperature of the second after treatment device;
        determine a position for the valve based on whether the temperature exceeds a pre-defined threshold for the temperature of the second after treatment device;
        output a control signal to the actuator system to move the valve to the first position or the second position based on the temperature of the second after treatment device;
        receive a shutdown command to shutdown an engine associated with the vehicle; and output the control signal to the actuator system to move the valve to a third position in which the exhaust gas stream flows through both the first portion and the second portion of the first after treatment device based on the shutdown command.

9. The control system of claim 8, wherein the first portion of the first after treatment device is a diesel oxidation catalyst and the second portion is a lean nitrogen oxide trap.

10. The control system of claim 9, wherein the second after treatment device is a diesel particulate filter coated with a selective catalytic reduction catalyst.

11. The control system of claim 9, wherein based on the first temperature exceeding the pre-defined threshold and a current valve position as the first position, the controller is configured to output the control signal to move the valve to the second position.

12. The control system of claim 11, wherein based on the current valve position as the second position, the controller is configured to determine a current load of an engine of the vehicle exceeds a pre-defined threshold for the load of the engine, and the controller is configured to output the control signal to move the valve to a third position in which the exhaust gas stream flows through both the first portion and the second portion of the first after treatment device.

13. The control system of claim 11, wherein based on the current valve position as the second position, the controller is configured to determine a performance of a regeneration of a diesel particulate filter associated with the second after treatment device, and the controller is configured to output the control signal to move the valve to a third position in which the exhaust gas stream flows through both the first portion and the second portion of the first after treatment device.

14. The control system of claim 11, wherein based on the current valve position as the second position, the controller is configured to output a signal to inject diesel exhaust fluid into the exhaust gas stream.

15. The control system of claim 9, wherein the controller is configured to receive a startup command to start an engine associated with the vehicle and to output the control signal to the actuator system to move the valve to the first position based on the start-up command.

16. The control system of claim 9, wherein based on the temperature as below the pre-defined threshold, the controller is configured to determine a loading of the second portion with combustion byproducts and to output a de-nitrogen oxide command to regenerate the second portion of the first after treatment device based on the determined loading of the second portion.

17. An exhaust system for a vehicle, comprising:
a diesel oxidation catalyst;
a lean nitrogen oxide trap;
an after treatment device in an exhaust pipe, the after treatment device downstream from the diesel oxidation catalyst and the lean nitrogen oxide trap;
a valve coupled to the diesel oxidation catalyst that is movable between a first position in which the exhaust gas stream flows through the valve to the diesel oxidation catalyst and a second position that causes the exhaust gas stream to flow through the lean nitrogen oxide trap;
an actuator system coupled to the valve and configured to move the valve between the first position and the second position; and
a controller, having a processor, configured to:
receive a shutdown command to shutdown an engine associated with the vehicle; and
output a control signal to the actuator system to move the valve to a third position in which the exhaust gas stream flows through both the diesel oxidation catalyst and the lean nitrogen oxide trap based on the shutdown command.

18. The exhaust system of claim 17, wherein the controller is further configured to:
process sensor signals to determine a temperature of the after treatment device;
determine a position for the valve based on whether the temperature exceeds a pre-defined threshold for the temperature of the after treatment device; and
output the control signal to the actuator system to move the valve to the first position or the second position based on the temperature of the after treatment device.

* * * * *